(12) United States Patent
Sawada

(10) Patent No.: US 6,801,522 B1
(45) Date of Patent: Oct. 5, 2004

(54) METHOD OF COMMUNICATING WITH SUBSCRIBER DEVICES THROUGH A GLOBAL COMMUNICATION NETWORK

(75) Inventor: Akemi Sawada, Chiba-ken (JP)

(73) Assignee: Yugen Kaisha LS Net, Urayasu (JP)

( * ) Notice: Subject to any disclaimer, the term of this patent is extended or adjusted under 35 U.S.C. 154(b) by 0 days.

(21) Appl. No.: 09/284,383

(22) PCT Filed: Aug. 14, 1998

(86) PCT No.: PCT/JP98/03631

§ 371 (c)(1),
(2), (4) Date: Apr. 12, 1999

(87) PCT Pub. No.: WO99/09716

PCT Pub. Date: Feb. 25, 1999

(30) Foreign Application Priority Data

Aug. 19, 1997 (JP) .......................... H09-222186

(51) Int. Cl.[7] .................. H04L 12/28; H04L 12/66; H04M 3/00; H04M 11/00
(52) U.S. Cl. ................ 370/352; 370/356; 370/389; 370/392; 370/401; 379/88.17; 379/265.09
(58) Field of Search .................. 370/352, 356, 370/389, 392, 400, 401, 465, 466, 467; 379/88.17, 88.21, 90.01, 93.01, 93.06, 93.07, 93.15, 114.01, 265.01, 265.02, 265.09

(56) References Cited

U.S. PATENT DOCUMENTS

| | | | | | |
|---|---|---|---|---|---|
| 5,805,587 A | * | 9/1998 | Norris et al. | ............... | 370/352 |
| 5,845,267 A | * | 12/1998 | Ronen | .......................... | 705/40 |
| 5,974,453 A | * | 10/1999 | Andersen et al. | ........... | 709/220 |
| 6,069,890 A | * | 5/2000 | White et al. | ................. | 370/352 |
| 6,075,796 A | * | 6/2000 | Katseff et al. | ............... | 370/466 |
| 6,101,182 A | * | 8/2000 | Sistanizadeh et al. | ....... | 370/352 |
| 6,141,345 A | * | 10/2000 | Goeddel et al. | ............ | 370/389 |
| 6,161,008 A | * | 12/2000 | Lee et al. | .................... | 455/414 |
| 6,205,135 B1 | * | 3/2001 | Chinni et al. | ............... | 370/356 |
| 6,347,085 B2 | * | 2/2002 | Kelly | ......................... | 370/352 |

FOREIGN PATENT DOCUMENTS

| JP | 3029827 | 11/1996 |
|---|---|---|
| JP | 09168174 | 6/1997 |
| JP | 1013602 | 5/1998 |

OTHER PUBLICATIONS

Nikkei Communication, Nov. 4, 1996, No. 233, PP107–108.

* cited by examiner

Primary Examiner—Alpus H. Hsu
(74) Attorney, Agent, or Firm—Notaro & Michalos P.C.

(57) ABSTRACT

When a call out is done by the destination communications device (11), the calling access server (15) generates the call-out packet, which packet is then sent to the called access server (15) through the Internet (16). The called access server (15) sends a ringing signal to the destination communications device (11). When the destination communications device (11) responds to the ringing signal, then the called access server (15) generates an acknowledge packet and returns the packet to the calling access server (15) through the Internet (16). The calling access server (15) then begins charging, and returns the acknowledge signal to the calling communications device for starting talk over the telephone. After that, talk packets are exchanged through the Internet (16). Finally, the termination is generated when the telephone call termination is detected with either of the calling and called access servers (15), and the termination of the telephone call is performed.

8 Claims, 6 Drawing Sheets

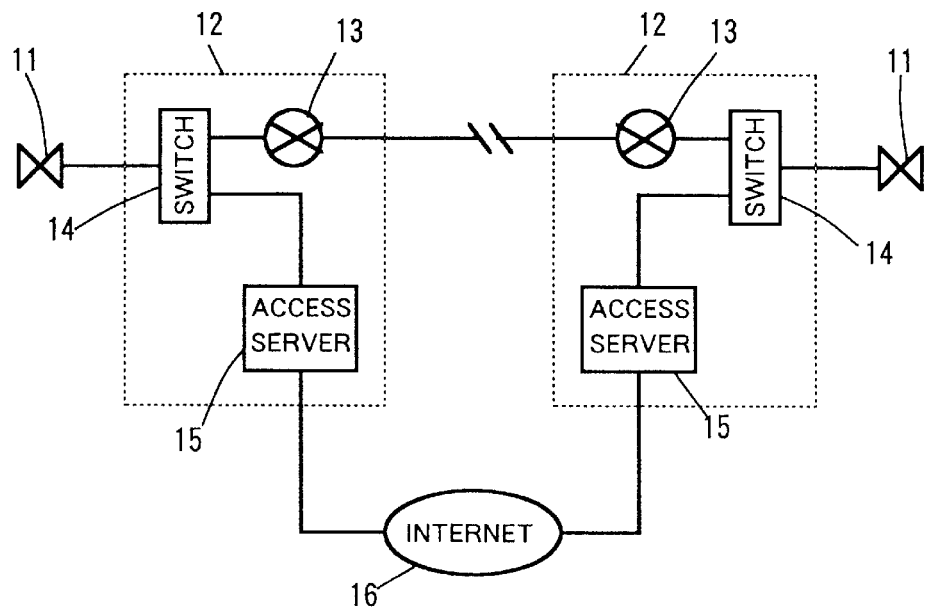
F I G. 1
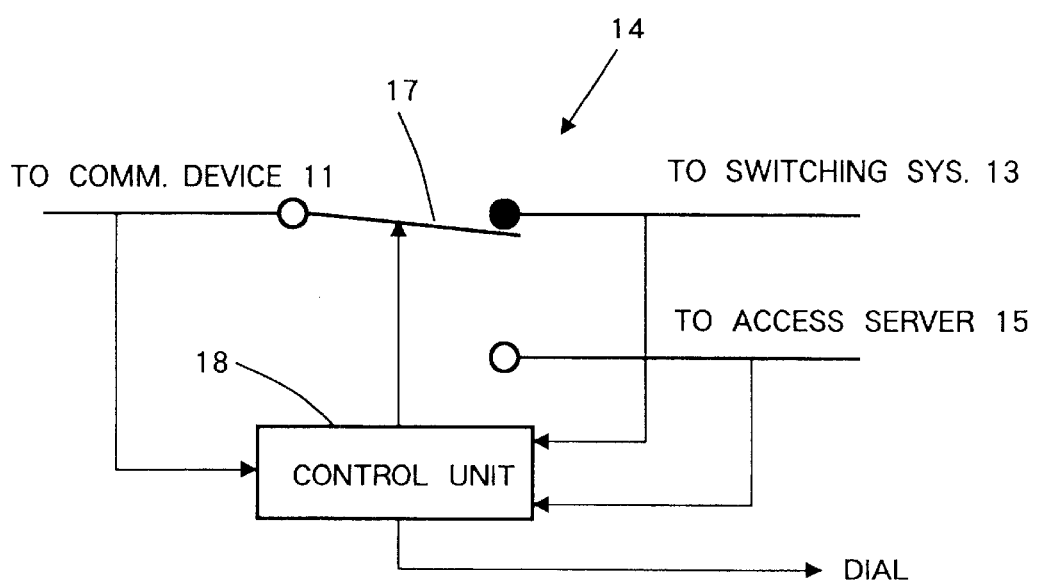
F I G. 2

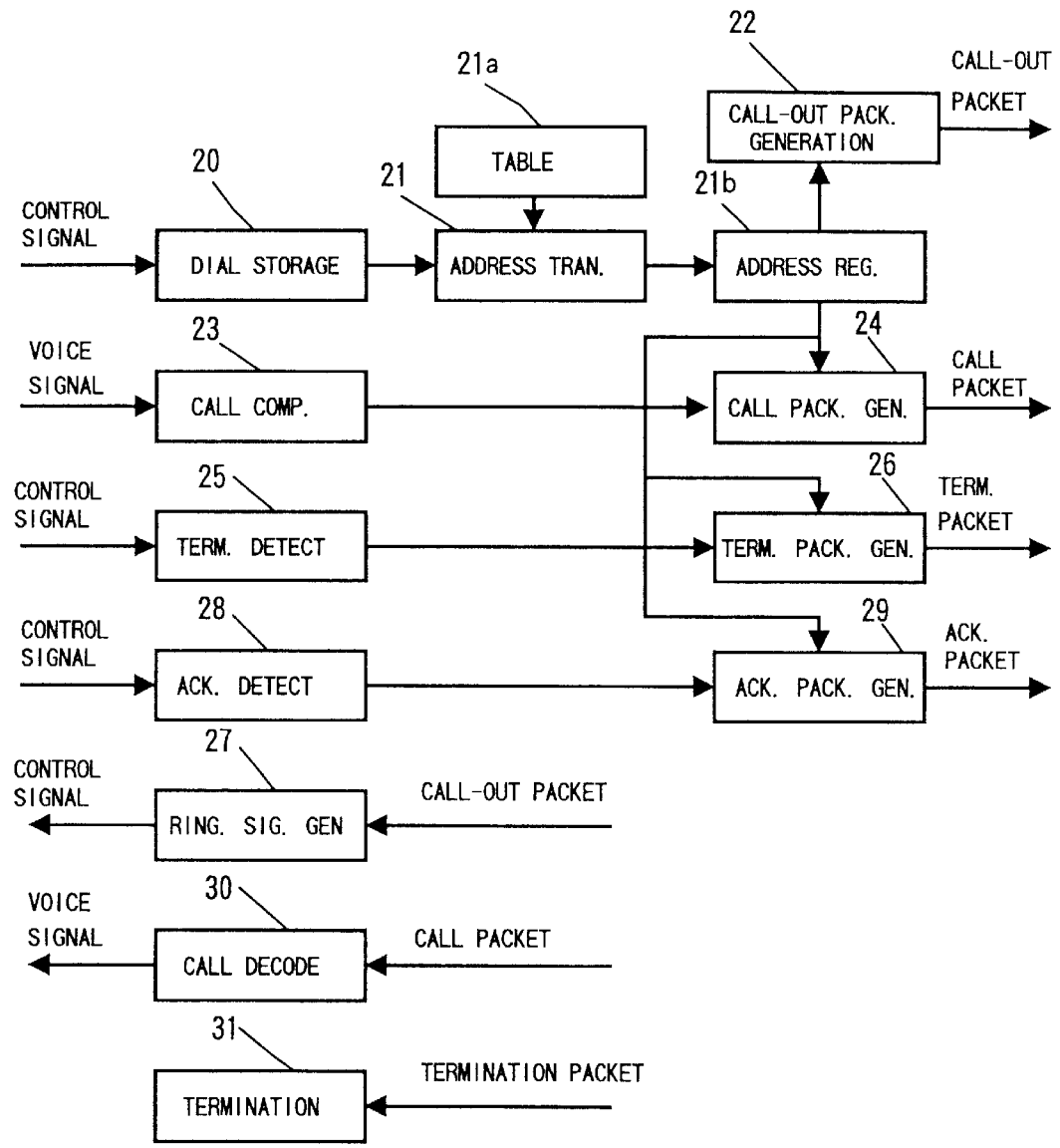
F I G. 3

CALL-OUT PACKET

CALL PACKET

TERMINATION PACKET

ACK. PACKET
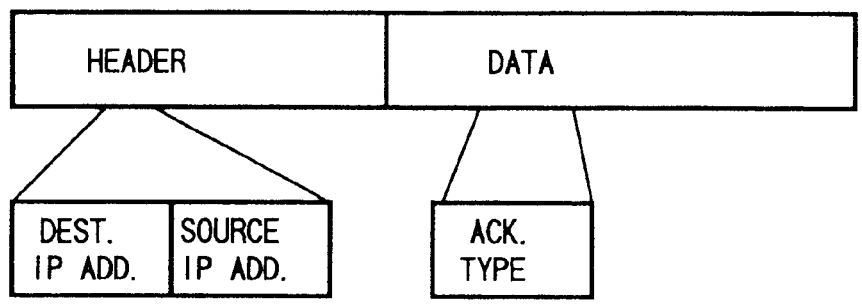
F I G. 4D
HYBRID IP PACKET
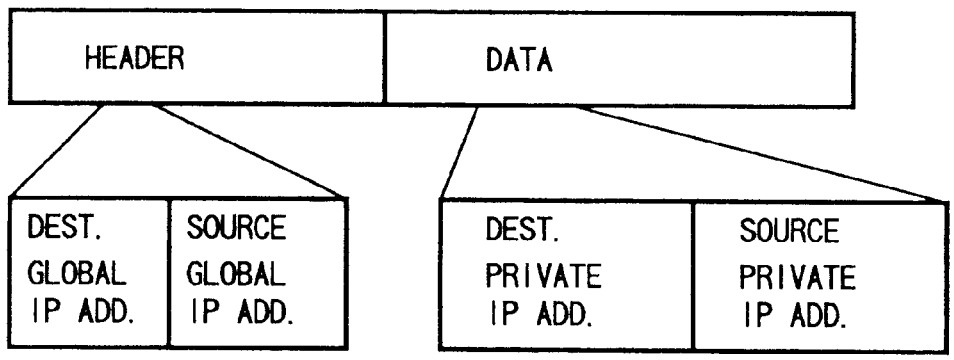
F I G. 4E

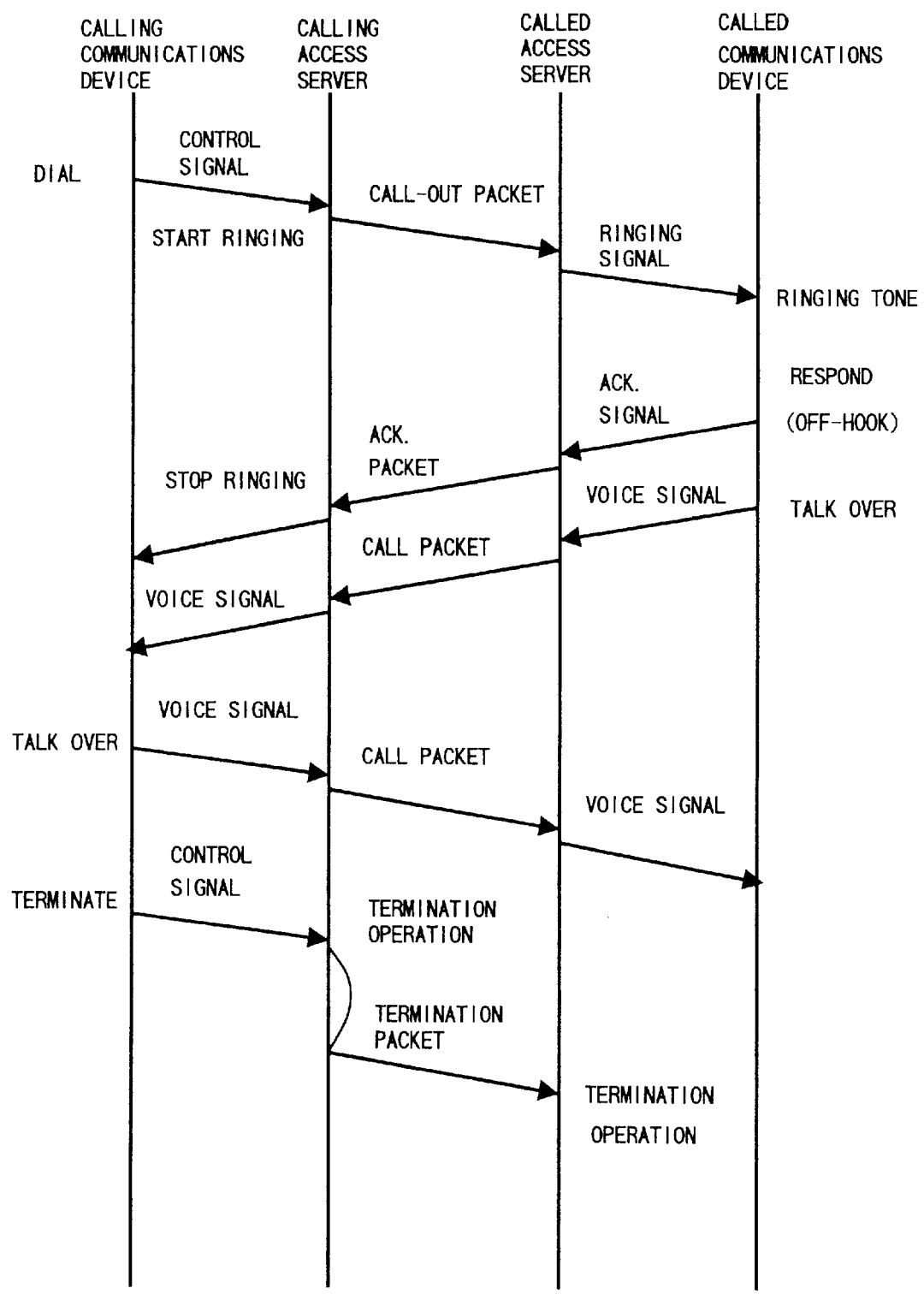
F I G. 5

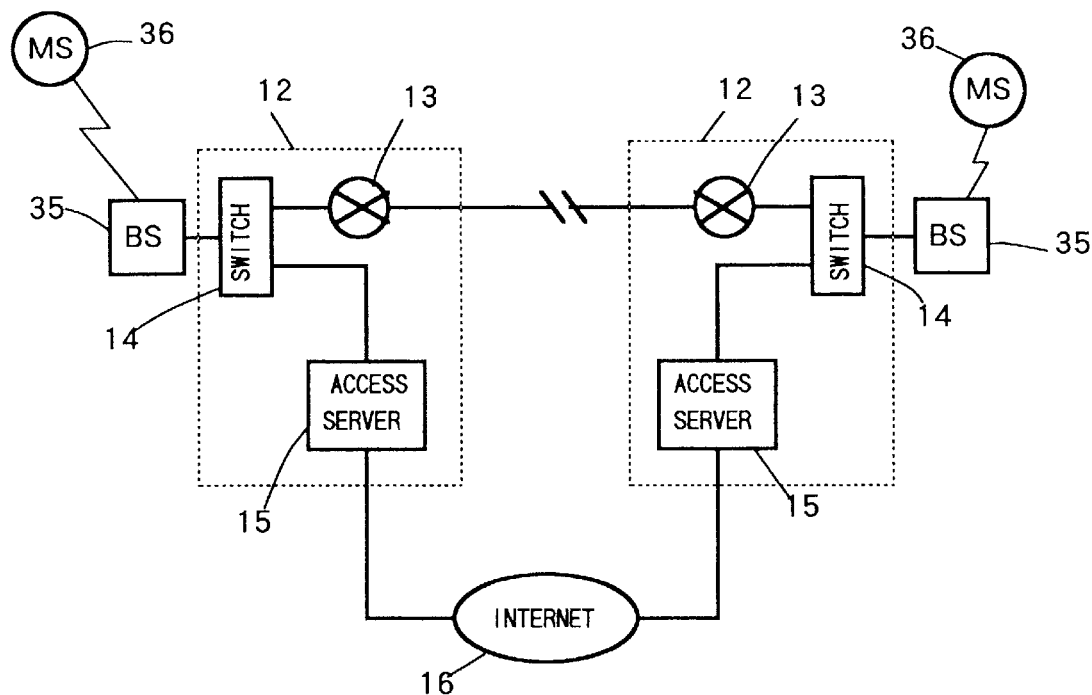
F I G. 6
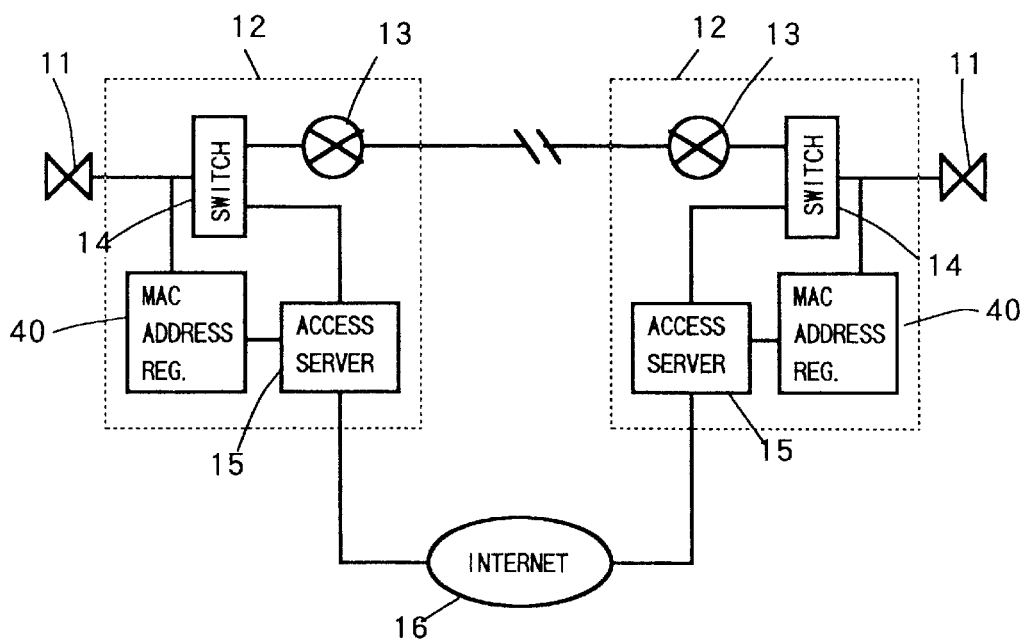
F I G. 7

METHOD OF COMMUNICATING WITH SUBSCRIBER DEVICES THROUGH A GLOBAL COMMUNICATION NETWORK

TECHNICAL FIELD

This invention relates to a communications technique for communications among communications devices using interconnected networks, or a global communications network, in particular, one enabling communications among communications devices connected to subscriber lines using an internetworking technique for example the Internet.

BACKGROUND ART

In recent years, communications have been available which using internetworking technologies. Specifically, communications using IP protocol which is an industry standard have been provided over the Internet. At first, most of communications services over the Internet were data communications such as FTP, TELNET, and SMTP. In these days, telephone calls over the telephone network have come to be substituted by communications over the Internet.

By the way, subscriber numbers of the telephone network and network communications addresses of the Internet, or IP addresses are completely independent from each other. Therefore, it is not possible to do a telephone call over the Internet with a subscriber number in a convenient manner. Usually, Both parties concerned who talk over the telephone should access a server (rendezvous server) on the Internet, at the same time. Alternatively, it is necessary to talk over the telephone by using special gateways on the Internet.

A related technology is a dial-up IP connection. When a communications device takes connection with the Internet by a dial-up IP connection, a related remote access server allocates the communications device with a non-fixed IP address. Therefore, it is not possible for a party on the Internet (on the remote access server) to access, with an IP address, a communications device which uses a dial-up IP connection. That is, a dial-up connection can be initiated only in one direction.

The present invention accordingly aims at enabling to access a communications device placed in a circuit switched network by using a network communications address.

DISCLOSURE OF THE INVENTION

According to the present invention, in order to attain the above mentioned object, a subscriber number of a subscriber device connected to a circuit switched network is associated with a network communications address of the subscriber device so that a party can telephone call with the subscriber device using the network communications address.

Control information for call-out control etc. can be communicated over a circuit switched network, or routed by using a network communications address. Moreover, as a signaling method, either of the common channel signaling system and the channel associated signaling system can be used.

The network communications address is an address for identifying a resource placed in an interconnected networks, and it is for instance the global IP address. Moreover, a combination of a global IP address of a network or the representing node of the network and a private address within the network can be used as the network communications address.

A subscriber device can be any type of device which has a communications function, and besides a telephone set, a computer, a television set, a set top box, kiosks, GPS and the like are acceptable.

In this configuration, it is possible to talk over the telephone to a communications device connected to a circuit switched network by using a network communications address for instance, a global IP address. Moreover, the communications device connected to the circuit switched network can be used as a resource on the Internet.

BRIEF DESCRIPTION OF THE DRAWINGS

FIG. 1 is a block diagram depicting the overall configuration of the first embodiment of the present invention;

FIG. 2 illustrates one example of a switch 14 of the first embodiment;

FIG. 3 illustrates an access server of the first embodiment;

FIGS. 4A, 4B, 4C, 4D and 4E illustrate various packets used in the first embodiment;

FIG. 5 illustrates the operation of the first embodiment;

FIG. 6 is a block diagram depicting the overall configuration of the second embodiment of the present invention;

FIG. 7 is a block diagram depicting the overall configuration of the third embodiment of the present invention.

BEST MODE FOR CARRYING OUT THE INVENTION

Figure 4A:
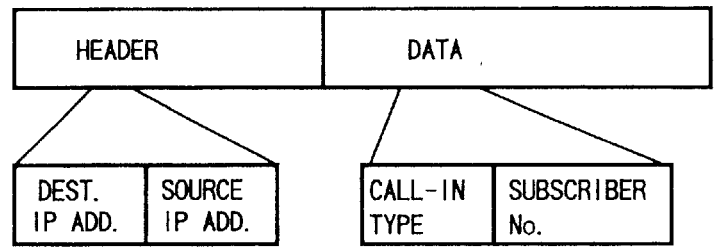

Embodiments of the present invention will be described below.

FIG. 1 shows an overview of the first embodiment of the present invention, and in this figure, communications devices (for example, telephone sets) 11 are connected to subscriber switching stations 12 via subscriber lines. The subscriber switching stations 12 are connected to each other through one or more relay switching stations (not shown in the figure). Each subscriber switching station 12 has a switch 14 and an access server 15 besides a conventional switching system 13. The switch 14 connects the communications device 11 selectively to the switching system 13 or the access server 15. The access server 15 is connected to the Internet 16 through a dedicated line. Global IP addresses (addresses identifying resources on a global communications network such as the Internet etc.) are assigned to the access servers 15 and the communications devices 11.

FIG. 2 illustrates the configuration of the switch 14, and in this figure the switch 14 comprises a switch function unit 17 and a control unit 18. In this embodiment, for communications using switched connection over the conventional switching system 13, a conventional subscriber number is dialed as it is. On the other hand, the dial is done adding a service identification number, for instance, "0AB0" (A and B are 5 for instance) to a usual subscriber number when communicating by the Internet 16. For instance, when a party calls the Japan Patent Office, the user dials the number of "0550-03-3581-1101." At the calling site, the control unit 18 detects the service identifier number, and then switches the switch function unit 17 to the access server 15, and sends the subscriber number thus received to the access server 15. In other situations, the switch function unit 17 is switched to the switching system 13. At the called site, the line on the switching system 13 and the line on the access server 15 are monitored, and the switching function unit 17 is switched to a line on which a signal begins to transmit. That switched state is maintained until the communications are terminated.

FIG. 3 shows schematically the functions of the access server 15. When it is functionally equivalent, other hardware (for instance, router or switch) can be used. In FIG. 3, functional blocks implemented with the access server 15 include a dial storage unit 20, an address translation unit 21, a call-out packet generation unit 22, a telephone call compression unit 23, a telephone call packet generation unit 24, a telephone call termination detecting unit 25, a termination packet generation unit 26, a ringing signal generation unit 27, an acknowledge signal detecting unit 28, an acknowledge packet generation unit 29, a telephone call decoding unit 30, and a telephone call termination unit 31, etc.

The dial storage unit 20 stores the dial data (03-3581-1101 for instance) sent from the control unit 18 of the switch 14. The address translation unit 21 converts the dial data (subscriber number) into a global IP address. Fixedly arranged communications devices (or non-mobile telephone sets or the like devices) are fixedly assigned with global IP addresses. Mobile communications devices'such as mobile telephone equipment can be dynamically assigned with variable IP addresses based on the area information. The address translation unit 21 performs conversion between a subscriber number and an IP address by consulting the table 21a associating subscriber numbers and IP addresses. The global IP address generated by the conversion is stored in the address register 21b. Then, telephone call information can be sent to the destination address by using the IP protocol with the IP address stored in the address register 21b. It is desirable to use IPv6 addresses (internet protocol version 6, RFC1883) as IP addresses because of the availability of a tremendous number of addresses. The address space of the IPv6 is wide.

The call-out packet generation unit 21 generates a call-out packet which is a control signal for call-out, and sends the call-out packet onto the Internet 16. The call-out packet, as shown in FIG. 4A, consists of the header portion and the data portion. The header portion includes the source address and the destination address. This destination address is the IP address generated with the address translation part 21, and the one corresponding to the subscriber number of the destination communications device. The source address is the IP address of the originating communications device or the access server. The data portion includes a packet type (call-out packet type) and the subscriber numbers etc. of the originating and destination communications devices. Information of the originating party can be advised to the destination party by using the subscriber number of the originating communications device. Moreover, the subscriber number of the destination communications device can be used for the call-out depending on circumstances.

The telephone call compression unit 23 compresses the telephone call data. The compression uses the correlation of voice, and removes the circumstantial noise and detects substantial non-speech part, and then sends the length of the non-speech part with a packet.

Figure 4B:
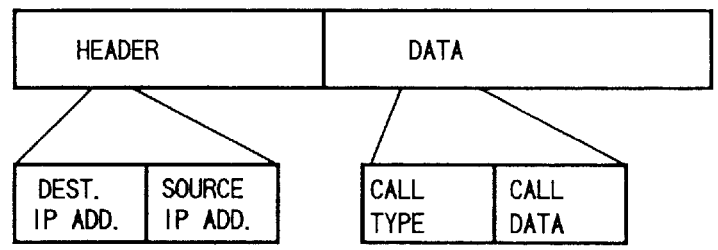

The telephone call packet generation unit 24 converts the compressed call data into packets which are then sent onto the Internet 16. The telephone call packet, as shown in FIG. 4B, consists of the header portion (including the destination address and source address) and data portion (including the packet type-telephone call packet, and the telephone call data.)

Figure 4C:
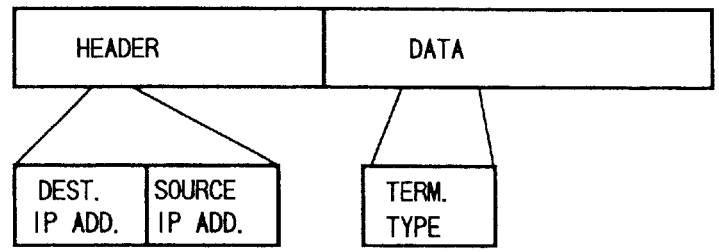

The telephone call termination detecting unit 25 detects the termination state of the communications device 11, and switches the switch 14 to the switching system 13 on the detection site, and then the telephone call is terminated. Moreover, the termination packet generation unit 26 generates a termination packet based on the detection of the telephone call termination and transmits the packet to the telephone call termination unit 31 of the access server 15 on the other party site. The termination packet, as shown in FIG. 4C, contains the data of the destination address, the source address, and the packet type (termination packet). The call termination unit 31 of the access server 15, upon receipt of the termination packet, transmits a termination control signal to the controller 18 of the switch 14 to switch the switch 14 to the switching system 13 and to terminates the call.

The ringing signal generation unit 27 supplies a ringing signal to the destination communications device 11 upon receipt of a call-out packet over the Internet 16. The ringing signal drives the ringer circuitry to inform that the communications device is in a call-in state. When the user makes the communications device enable to talk over responding to the ringing tone, an acknowledge signal is generated and returned to the access server 15. The acknowledge packet detecting unit 28 of the access server 15 detects the acknowledge signal, and the acknowledge packet generation unit 28 sends the acknowledge packet onto the Internet 16 in response to the detection of the acknowledge signal. The acknowledge packet includes a destination address, a source address, and the packet type as shown in FIG. 4D.

FIG. 5 illustrates the operation of the embodiment. Apparent from the drawing, when a call-out is done by the destination communications device 11, the calling access server 15 generates the call-out packet. The call-out packet is sent to the called access server 15 through the Internet 16. The called access server 15 supplies a ringing signal to the destination communications device 11. When the destination communications device 11 responds to the ringing signal, then the called access server 15 generates an acknowledge packet and returns the packet to the calling access server 15 through the Internet 16. The calling access server 15 begins charging at the time of receiving that packet. The calling access server 15 returns the acknowledge signal to the calling communications device to make the calling communications device to begin talking over the telephone. After that, call packets are exchanged by way of the Internet 16. Finally, a termination packet is generated when the telephone call termination is detected with either of the calling and called access servers 15, and the termination of the telephone call is performed.

While, in this embodiment, the access servers 15 are placed in the subscriber switching stations, the access servers can be located in relay switching stations so that a bypass is made between the relay switching stations or between a relay switching station and a subscriber switching station. For a subscriber switching station with no access server, a conventional telephone call switching operation is performed from the originating party to the relay switching station supervising the subscriber switching station, and the communications can be connected to the Internet at the relay switching station.

Moreover, in a network design in which an access server represents a network and communications devices are hosts within the network, the network address and host address can be assigned to the access server and the communications devices respectively. Of course, other address allocations can be adopted.

Moreover, a configuration can be adopted in which a user can call out by using not a subscriber number but an IP address. In this case, it is possible to distinguish between a call using a subscriber number and a call using an IP address based on a service number (0AB0 etc.). As an IP address, original numeric IP addresses or domain names and subdomain names are acceptable. When alphabetical symbols can not be dialed, numerical numbers can be combined to encode (encode and decode) the alphabetical symbols.

Moreover, when a communications device 11 is directly accessed from the Internet 16, at first, a call-out packet is transmitted thereto and then an acknowledge packet is received therefrom, and after that, communications are performed in accordance to the corresponding application protocol. In this case, it is desirable to inform the accessing party that the communications cost is charged thereto. For instance, when a user accesses the communications device from the anchor tag on a WWW web page, it is desirable to advise that the communications cost is charged thereto, in response to the user's click operation onto the anchor area and makes a call-out packet to transmit after the user consents the charge (the user transmits an OK signal). (when the transmission is through an Internet service provider, the provider pays the charge for the user). The anchor area can be distinguished by different colors etc.

Moreover, other network communications addresses can be used in stead of global IP addresses for specifying communications devices 11. For instance, an IP address of an access server 15 or the network in which the access server 15 is placed can be combined with an identifier (called as to private address) assigned to each communications device under the control of the access server 15 (or the switching station 12) and only effective within the switching station control area, in order to identify the each communications device 11. FIG. 4E shows an example of the IP packet in this case. In that IP packet, the header portion includes IP addresses of the destination access server and the originating access server, and the data includes private IP address of the destination communications device and the originating communications device. The global IP address is used for routing operations among the access servers, and the private address is extracted for operation of the access server concerned. All the addresses can be generated with the address translation unit 21. Any type of private address can be used if it is uniquely assigned within the access server control domain (virtual network). For example, instead of private IP addresses, host names, telephone numbers or the like can be used.

In this embodiment, control signals are communicated by the channel associated signaling system, and the control signals as well as voice signals are transmitted as packets through the Internet. However, the control signals can be separately transmitted through a conventional circuit switched network. Moreover, in a network system using the common channel signaling system like ISDN, control signals can be communicated through the common channel as conventional. When the common channel signaling system is adopted, a calling switching station can be designed to obtain the global IP address corresponding to a called subscriber number from the called switching station, so that each switching station stores only translation data for subscriber numbers within the station.

Moreover, when data other than the signal of a usual telephone call are transmitted by the high frequency signal by using DSL (digital scriber line) technique, the switch 14 can be composed of a frequency separation device. In this case, it is possible to transmit a call-out, call-in and other control signals via an associated channel or a common channel, and to separate information data such as voice data by the frequency separation device and transmit them onto the Internet 16.

Next, the second embodiment in which the present invention is applied to a mobile communications system will be described. FIG. 6 shows an overview of this embodiment, in which the corresponding parts to those in FIG. 1 are indicated with the corresponding referential symbols.

In FIG. 6, base stations 35 are connected to switching stations (mobile switching stations) 12. More specifically, the base stations 35 are connected to the switching stations and the access servers through the switches 14. Each base station 35 performs radio communications with mobile stations 36 within the corresponding area. Moreover, in the mobile communications system of the embodiment, the positions of mobile stations 36 are registered. The position registration is done for each position registration area (including one or more base station areas) as with a conventional mobile communications system. An IP packet for position registration is sent by a multicast operation etc. when the position of a mobile station 36 is different from the last range of registration and the table 21a of the address translation unit 21 is updated.

In this example as well, it is possible to communicate through the Internet 16 by doing the same procedures as shown in FIG. 5. Moreover, the mobile stations 36 can be replaced with fixed radio communications devices. Further, the fixed radio communications devices can be placed together with the mobile stations. Update of the position registration is not necessary for the fixed radio communications devices.

Moreover, by connecting an access servers 15 of the mobile communications system to an access servers 15 of the conventional circuit switched system through the Internet, the communications can be performed between the communications device of the mobile communications system and the communications device of the conventional circuit switched system. Moreover, a global IP address and a private address can be combined to identify a mobile station (communications device).

Next, another embodiment using identifiers uniquely assigned to communications devices (or uniquely assigned to communications parts of the communications devices) for example MAC addresses will be described. FIG. 7 shows an overview of the third embodiment, in which the corresponding parts to those in FIG. 1 are indicated with the corresponding referential symbols. In FIG. 7, the subscriber switching stations 12 have MAC address registration units 40. A MAC address registration unit 40 of a subscriber switching station, upon detection of the connection state of a communications device 11, submits a transmission request to the communications device 11, and receives from the communications device 11 its MAC address. When the received MAC address is the same as the last value, nothing is done. When the address is different from the last one, the value is registered, and a pair of the subscriber number and the MAC address are packetized and multicasted to other access servers. Each MAC address registration unit 40 stores not only relationships between MAC addresses and subscriber numbers of communications devices controlled by the concerned server, but also those of communications devices controlled by other servers.

When the MAC address of the subscriber line can be modified for example upon the connection of the communications device 11 with the subscriber line, the communications device detects the modification and requests the MAC address registration unit 40 to modify the registration data.

In this embodiment, a user calls out by directly or indirectly specifying a MAC address. In the calling site, firstly, the MAC address of the destination communications device is translated into the subscriber number consulting with the MAC address registration unit 40, and the subscriber number thus translated is further converted into the IP address by the address translation unit 21. After that, communications are performed through the Internet 16. When a subscriber line is cut off (for instance, a communications device is detached from the modular socket), It is desirable to reset the corresponding data of the MAC address registration unit 40. More specifically, data indicative that the subscriber number concerned has no corresponding MAC address is set.

In this embodiment, it is possible to communicate by MAC addresses regardless of the subscriber numbers. Whether an IP address is determined based on a MAC address or a subscriber number can be indicated by the addition of a service identifier number (for instance, $0A_1B_10$ is used for the MAC address and $0A_2B_20$ is used for the subscriber number).

It is desirable for a user to consult with a private directory or a directory service provided by a third party when the user performs communications with MAC address.

Moreover, the data base server which maps MAC addresses onto subscriber numbers can be installed on the Internet, and this data base server can be used in stead of the MAC address registration units. In this case, a design can be implemented such that information attained from the database server can be cached.

Moreover, any types of identifiers uniquely assigned to the devices can be adopted to identify the devices, and other identifiers than MAC addresses can be used. For instance, it can be an personal identifier stored in a personal identifier card which communicates with a communications device. Moreover, the identifier can be not only of the type which is fixedly written into the device like a MAC address but also of the type which a user or other party can set later. The settable identifier is maintained in nonvolatile after setting.

While the invention has been described mainly in connection with telephone services, the invention can be widely applied to data communications and other wide spread range of communications without departing from the sprit and scope of the invention.

INDUSTRIAL APPLICABILITY OF THE INVENTION

As described above, according to the invention, it is possible to communicate with destination communications device using its IP address. Moreover, it is possible to harmonize the conventional subscriber network infrastructure and the Internet infrastructure by accessing subscriber devices by not only conventional subscriber numbers but also global IP addresses.

What is claimed is:

1. In a communications system having a line from a subscriber device, connected to a global communications network, through a branch point of the line at an input side of a switching station which provides telephone services to the subscriber device, a method of telephone-communicating with said subscriber device utilizing a first access device connected to a calling subscriber device and located between the branch point and the global communication network, the first access device having address translation means for translating between a subscriber identifier and a global IP address, a calling-out means for translating between a calling-out control signal and a calling-out packet, and a voice translation means for translating between a voice signal and voice packets; the method comprising the steps of;

converting, by means of the address translation means of the first access device, the subscriber identifier of a called subscriber device, input by the calling subscriber device, to a global IP address;

translating, by means of a calling-out means of the first access device, from the calling-out control signal received from the calling subscriber device through the line and the branch point, to the calling-out packet;

routing the calling-out packet for calling out the called subscriber device, using the global IP address thus obtained, to a second access device connected to the called subscriber device through; a branch point and a line;

translating, by means of a calling-out means of the second access device, the calling-out packet thus routed, to a calling-out control signal for transferring the same to the called subscriber device;

translating, by means of a voice translation means of the first access device, from a voice signal to telephone talk packets;

routing, with the global IP address thus obtained, one or more telephone talk packets to be sent to the called subscriber device, to the second access device through the global communications network; and translating, by means of a voice translation means of the second access device, from the telephone talk voice packets thus routed, to a voice signal for transferring the same to the called subscriber device through the branch point and the line, after calling out.

2. In a communications system having a line from a subscriber device, connected to a global communications network, through a branch point of the line at input side of a switching station which provides common channel signaling system services to the subscriber device, a method of communicating with said called subscriber device, comprising the steps of:

calling out a called subscriber device using the common channel signaling system services of switching stations to which a calling subscriber device and called subscriber device are connected respectively;

receiving acknowledgement from the called subscriber device;

receiving a global IP address of the called subscriber device from a switching station to which the called subscriber device is connected, using the common channel signaling system services; and after receiving the acknowledgment and the global IP address, routing, with the global IP address thus received, one or more telephone talk voice packets to be sent to the called subscriber device, through the global communications network, the branch point, and the line, after calling out.

3. The method of claim 2, wherein the global IP address being uniquely assigned to the called subscriber device.

4. The method of claim 2, wherein the called subscriber device is identified by a combination of a global IP address of a corresponding switching station and an auxiliary identifier assigned to the called subscriber device.

5. The method of claim 2, wherein the branch point is placed at an input side of a subscriber switching station.

6. The method of claim 2, wherein the branch point is placed at an input side of a relay switching station.

7. In a communications system having a line from a subscriber device, connected to a global communications network, through a branch point of the line at input side of a switching station which provides telephone services to the subscriber device, a method of communicating with said subscriber device utilizing an access device located between the branch point and the global communication network, the access device having address translation means for translating between an identifier of a subscriber line and a global IP address, calling-out means for translating between a calling-out control signal and a calling-out packet, and voice translation means for translating between a voice signal and voice packets;

the method comprising the steps of:

converting a unique identifier of a called subscriber device to an identifier of a subscriber line to which the called subscriber device is connected;

converting, by means of an address translation means of a first access device connected to a calling subscriber device through a line and a branch point, the identifier of the subscriber line to a global IP addressed;

translating, by means of a calling-out means of the first access device, from a calling-out control signal received from the calling subscriber device through the line and the branch point, to a calling-out packet;

routing the call-out packet for calling out the called subscriber device, using the global IP address thus obtained, to a second access device connected to the called subscriber device through a branch point and a line;

translating, by means of a calling-out means of the second access device, the calling-out packet thus routed, to a calling-out control signal for transferring the same to the called subscriber device;

translating, by means of a voice translation means of the first access device, from a voice signal to telephone talk packets; and routing, with the global IP address, one or more packets to be sent to the subscriber device, to the second access device through the global communications network; and translating, by means of a voice translation means of the second access device, from the telephone talk voice packets thus routed, to a voice signal for transferring the same to the called subscriber device through the branch point and the line, after calling out.

8. The method of claim 7, wherein the unique identifier of the called subscriber device is determined by at least one of the called subscriber device, a part of the called subscriber device, and an auxiliary device which communicates data with the called subscriber device.

* * * * *